US006853094B2

(12) United States Patent  (10) Patent No.: US 6,853,094 B2
Feddersen et al.  (45) Date of Patent: Feb. 8, 2005

(54) VARIABLE SPEED WIND TURBINE HAVING A PASSIVE GRID SIDE RECTIFIER WITH SCALAR POWER CONTROL AND DEPENDENT PITCH CONTROL

(75) Inventors: Lorenz Feddersen, Flensburg (DE); Eckardt Siebenthaler, Skjern (DK); Björn Andresen, Varde (DK)

(73) Assignee: Vestas Wind Systems A/S, Rinkobing (DK)

( * ) Notice: Subject to any disclaimer, the term of this patent is extended or adjusted under 35 U.S.C. 154(b) by 0 days.

(21) Appl. No.: 10/858,721

(22) Filed: Jun. 1, 2004

(65) Prior Publication Data

US 2004/0217596 A1 Nov. 4, 2004

Related U.S. Application Data

(62) Division of application No. 10/074,904, filed on Feb. 11, 2002.

(51) Int. Cl.[7] .................................................. H02P 9/04
(52) U.S. Cl. ................................................. 290/44; 322/29
(58) Field of Search ......................... 290/44, 55; 322/29

(56) References Cited

U.S. PATENT DOCUMENTS

| 5,083,039 A | * | 1/1992 | Richardson et al. ........... 290/44 |
| 5,155,375 A | * | 10/1992 | Holley .......................... 290/44 |
| 5,225,712 A | * | 7/1993 | Erdman ......................... 290/44 |
| 5,663,600 A | * | 9/1997 | Baek et al. .................... 290/55 |
| 5,798,632 A | * | 8/1998 | Muljadi ......................... 322/29 |
| 5,907,192 A | * | 5/1999 | Lyons et al. ................... 290/44 |
| 6,137,187 A | * | 10/2000 | Mikhail et al. ................ 290/44 |
| 6,420,795 B1 | * | 7/2002 | Mikhail et al. ................ 290/44 |
| 6,670,721 B2 | * | 12/2003 | Lof et al. ....................... 290/44 |

* cited by examiner

*Primary Examiner*—Nicholas Ponomarenko
(74) *Attorney, Agent, or Firm*—Finnegan, Henderson, Farabow, Garrett & Dunner, LLP

(57) ABSTRACT

A variable speed wind turbine having a passive grid side rectifier using scalar power control and dependent pitch control is disclosed. The variable speed turbine may include an electrical generator to provide power for a power grid and a power conversion system coupled to the electrical generator. The power conversion system may include at least one passive grid side rectifier. The power conversion system may provide power to the electrical generator using the passive grid side rectifier. The variable speed wind turbine may also use scaler power control to provide more precise control of electrical quantities on the power grid. The variable speed wind turbine may further use dependent pitch control to improve responsiveness of the wind turbine.

33 Claims, 9 Drawing Sheets

VARIABLE SPEED WIND TURBINE HAVING A PASSIVE GRID SIDE RECTIFIER WITH SCALAR POWER CONTROL AND DEPENDENT PITCH CONTROL

RELATED APPLICATION

This application is a divisional of application Ser. No. 10/074,904, entitled "VARIABLE SPEED WIND TURBINE HAVING PASSIVE GRID SIDE RECTIFIER WITH SCALAR POWER CONTROL AND DEPENDENT PITCH CONTROL, filed on Feb. 11, 2002, which is hereby incorporated herein by reference.

FIELD OF THE INVENTION

The present invention relates generally to variable speed wind turbines, and, more particularly, to a variable-speed wind turbine having a passive grid side rectifier with scalar power control and dependent pitch control.

BACKGROUND OF THE INVENTION

A wind turbine is an energy converting device. It converts kinetic wind energy into electrical energy for utility power grids. This type of energy conversion typically involves using wind energy to turn wind blades for rotating a rotor of an electrical generator. Specifically, wind applied to the wind blades creates a force on the rotor, causing the rotor to spin and convert the mechanical wind energy into electrical energy. Hence, the electrical power for such a generator is a function of the wind's power. Because wind speed fluctuates, the force applied to the rotor can vary. Power grids, however, require electrical power at a constant frequency, such as 60 Hz or 50 Hz. Thus, a wind turbine must provide electrical power at a constant frequency that is synchronized to the power grids.

One type of wind turbine that provides constant frequency electrical power is a fixed-speed wind turbine. This type of turbine requires a generator shaft that rotates at a constant speed. One disadvantage of a generator shaft that rotates at a constant speed is that it does not harness all of the wind's power at high speeds and must be disabled at low wind speeds. That is, a generator limits its energy conversion efficiency by rotating at a constant speed. Therefore, to obtain optimal energy conversion, the rotating generator speed should be proportional to the wind speed.

One type of wind turbine that keeps the rotating generator speed proportional to the wind speed is a variable speed wind turbine. Specifically, this type of turbine allows a generator to rotate at continuously variable speeds (as opposed to a few preselected speeds) to accommodate for fluctuating wind speeds. By varying rotating generator speed, energy conversion can be optimized over a broader range of wind speeds. Prior variable speed wind turbines, however, require complicated and expensive circuitry to perform power conversion and to control the turbine.

One prior variable speed wind turbine is described in U.S. Pat. No. 5,083,039, which describes a full power converter having a generator side active rectifier coupled to a grid side active inverter via a direct current (DC) link. In this configuration, the active rectifier converts variable frequency AC signals from the generator into a DC voltage, which is placed on the DC link. The active inverter converts the DC voltage on the DC link into fixed frequency AC power for a power grid. A disadvantage of such a configuration is that it requires complicated and expensive circuitry utilizing active switches (e.g., insulated-gate bipolar transistors IGBTs) for the active rectifier and inverter. These types of active switches typically have higher power loss during power conversion and cause unwanted high frequency harmonics on the power grid. Furthermore, both the active rectifier and inverter must be controlled. Moreover, active components are less reliable than passive components.

Another prior variable speed wind turbine is described in U.S. Pat. No. 6,137,187, which includes a doubly-fed induction generator and a back-to-back power converter. The power converter includes a generator side converter coupled to a grid side converter via a DC link. Both the generator and grid side converters include active switches. The turbine described in the '187 patent is a partial conversion system because only a portion of the generator's rated power ever passes through the back-to-back converter. Moreover, unlike the power converter of the full conversion system, power flows through the converter in opposite directions. That is, power can flow to the rotor windings from the power grid in order to excite the generator or power can flow from the rotor windings to supplement the constant frequency AC power from the stator with constant frequency AC power from the rotor.

To supply power from the power grid to the rotor windings through the back-to-back converter, the grid side converter acts as a rectifier and converts constant frequency AC signals into a DC voltage, which is placed on the DC link. The generator side converter acts as an inverter to convert the DC voltage on the DC link into variable frequency AC signals for the generator, so as to maintain constant frequency power on the stator. To supply power from the rotor windings to the grid through the back-to-back converter, the generator side converter acts as a rectifier and converts variable frequency AC signals into a DC voltage, which is placed on the DC link. The grid side converter then acts as an inverter to convert the DC voltage on the DC link into fixed frequency power for the grid. A disadvantage of this type of back-to-back converter is that it requires complicated and expensive circuitry utilizing active switches for both converters. As stated previously, using active switches can typically cause unwanted power loss during power conversion and unwanted high frequency harmonics on the power grid. Furthermore, like the prior full power converter, both converters must be controlled, and active components are less reliable than passive components.

One type of control of the generator side converter involves transforming AC signals representing three phase generator electrical quantities into parameters with a coordinate transformation so that the generator can be controlled using DC values (which is known as Park-transformation). This type of control is a form of "field oriented control" (FOC). A disadvantage of using FOC-type control is that useful information regarding the AC signals may-be lost in the transformation process. Specifically, FOC assumes that the AC signals of the three phases are symmetrical (that is, that they only differ in phase). In certain instances, the AC signals are asymmetrical and useful AC information may be lost during the transformation from AC signals into DC values.

Furthermore, because FOC loses information when transforming to DC values, FOC is unable to be used in a system that independently controls the electrical quantities (e.g., voltage, current) of each phase of the power grid. Theoretically, this should not pose a problem because the electrical quantities for each phase of an ideal power grid should not vary. In actuality, however, the electrical quantities on each phase of the power grid may vary, causing uneven thermal stress to develop on the generator and non-optimal power generation. Accordingly, it would be desirable to independently control these electrical quantities for each of the three phases of the power grid.

Another aspect of a wind turbine is a pitch controller. Typical generators ramp up to a preselected constant speed of operation, known as "rated speed." When the generator is operating at, or just before reaching, rated speed, the turbine controls the angle at which the turbine's blades face the wind, known as the "pitch angle" of the blades. By controlling the pitch angle, the turbine can maintain the generator at a rated speed. Pitch controllers, however, typically operate at a low frequency as compared to power conversion controllers. Thus, pitch controllers are slow to react to rapid changes in speed, which are typically caused by wind gusts.

SUMMARY OF THE INVENTION

One aspect of the present invention discloses a variable speed wind turbine. For example, the variable speed turbine may include an electrical generator to provide power for a power grid and a power conversion system coupled to the electrical generator. The power conversion system may include at least one passive grid side rectifier to power to the electrical generator. Another aspect of the present invention discloses a variable speed wind turbine that may use scalar power control to provide more precise control of electrical quantities on the power grid. Still another aspect of the present invention discloses a variable speed wind turbine that may use dependent pitch control to improve responsiveness of the wind turbine.

BRIEF DESCRIPTION OF THE DRAWINGS

The accompanying drawings, which are incorporated in, and constitute a part of, this specification illustrate implementations of the invention and, together with the description, serve to explain the principles of the invention. In the drawings.

DETAILED DESCRIPTION

Figure 1:
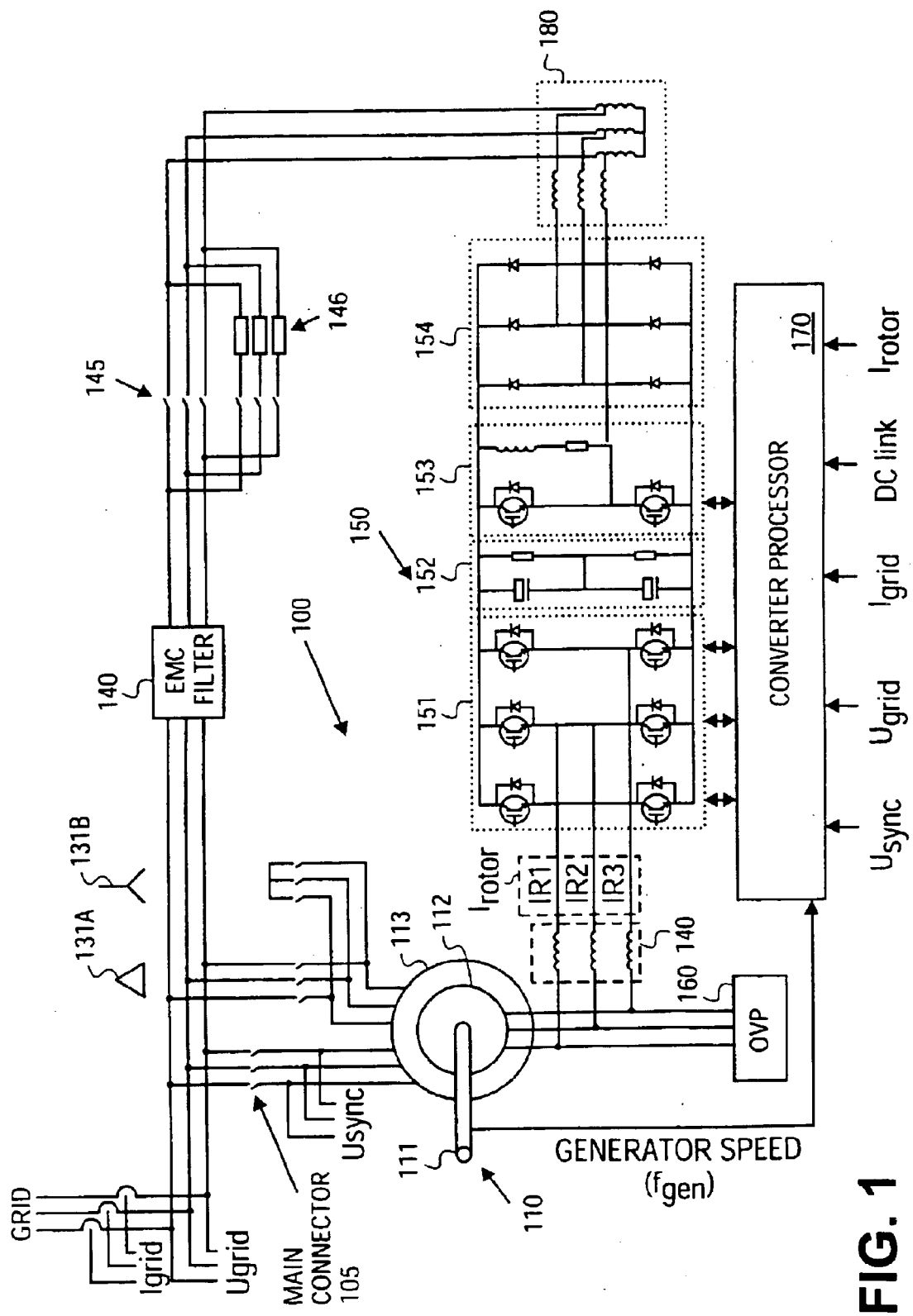
FIG. 1 illustrates one implementation of a circuit diagram for a variable speed wind turbine having a passive grid side rectifier configuration.

Reference will now be made in detail to implementations of the invention, examples of which are illustrated in the accompanying drawings. Wherever possible, the same reference numbers will be used throughout the drawings to refer to the same or like parts.

The variable speed wind turbine described herein provides a simplified power converter using a passive grid side rectifier, which avoids using active switches. For example, the passive rectifier could be comprised of diodes. As such, the passive grid side rectifier does not require processor control and provides for a more reliable power converter. In particular, passive components are more reliable than active components. Furthermore, because active switches can cause power loss during power conversion, the passive grid side rectifier can improve power conversion efficiency for the wind turbine. In addition, using a passive grid side rectifier does not produce high frequency harmonics and provides less expensive and complicated circuitry for a power converter in the wind turbine.

The wind turbine also provides instantaneous control of rotor currents of a generator to control the instantaneous power provided to a power grid ("scalar power control"). Scalar power control can be responsive to the actual electrical characteristics for each phase of a power grid.

The wind turbine further uses dependent pitch control that is dependent on the power controller ("dependent pitch control"). In particular, one implementation discloses a low-speed pitch controller that receives signals or information from a high-speed power controller, thereby improving the responsiveness of the pitch controller.

As described in further detail below, the variable speed wind turbine may be implemented with a doubly-fed wound rotor induction generator to produce electrical power. The generator may operate at below synchronous speed and above synchronous speed.

Synchronous speed is the speed at which a rotor (mechanical speed) is rotating at the same speed as the magnetic fields in a stator. In the context of the wind turbine described below, synchronous speed can be 1800 rpm. Typically, the stator frequency is fixed to the power grid frequency. In the United States, the nominal power grid frequency is 60 Hz, meaning that the stator frequency is 3600 rpm. For a generator having four poles (or two pole pairs), the generator's synchronous speed would be 3600 rpm/2 or 1800 rpm. In the following implementations, operation at below synchronous speed refers to a generator speed or rotor speed that is below 1800 rpm. Operation at above synchronous speed refers to a rotor speed that is above 1800 rpm. The precise value for synchronous speed in the context of this description depends on factors such as generator design (e.g., number of pole pairs) and utility grid frequency (e.g., 50 Hz in Europe). The wind turbine described below can be designed to operate at any desired synchronous speed.

In the implementations described herein, by controlling the active elements of an electrical generator's rotor side converter or inverter and by controlling the pitch of the turbine blades, a desired amount of constant frequency power may be supplied from the generator's stator windings. At rotor speeds below synchronous speed, excitation power can be supplied to the generator's rotor from a power grid using the passive grid side rectifier. At rotor speeds above synchronous speed, power flow can be reversed due to excess power from the electrical generator's rotor, which requires that the excess power be dissipated in the power converter.

Passive Grid Side Rectifier Configuration

Figure 3:
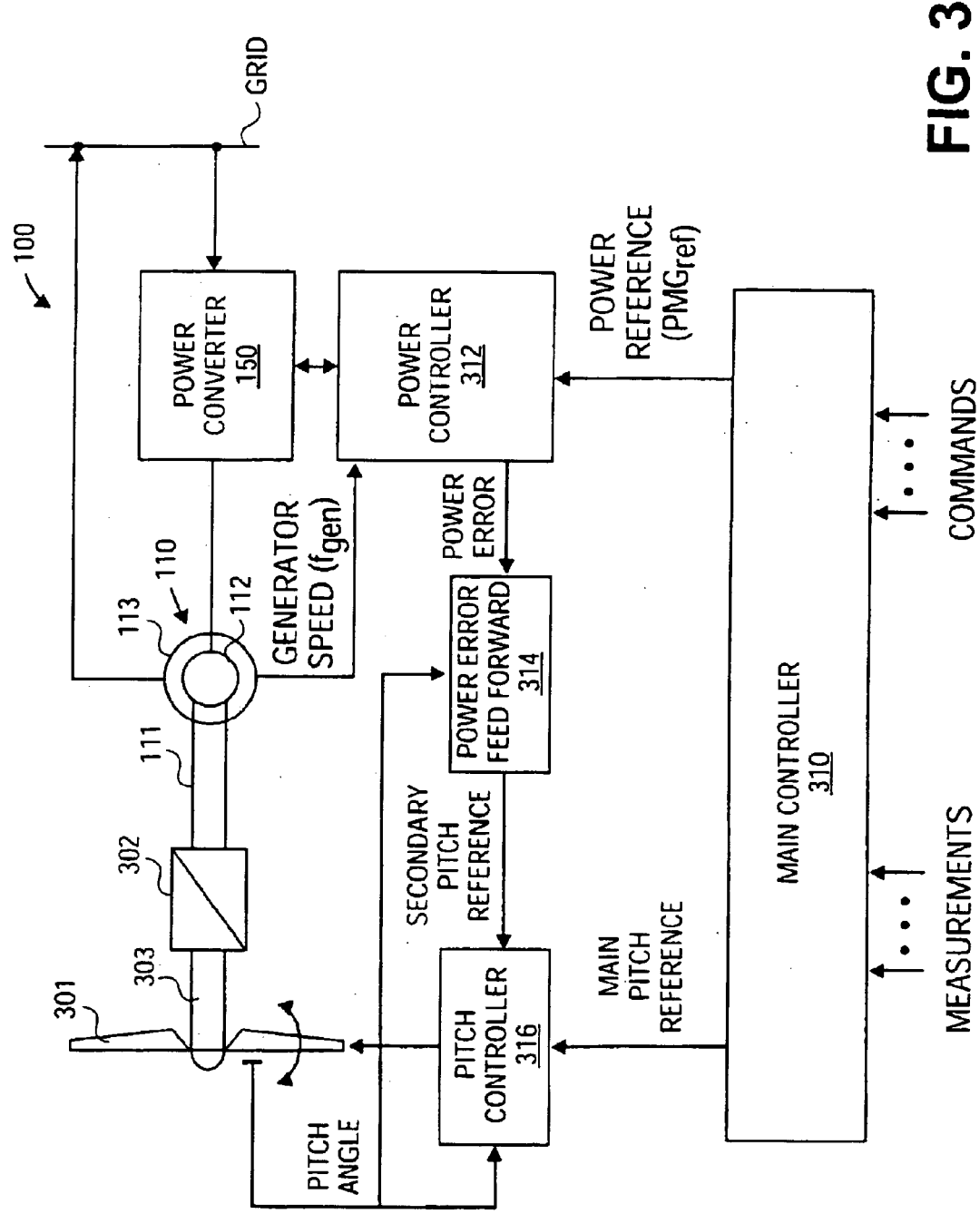
FIG. 3 illustrates a block diagram of one implementation of a scalar power control and dependent pitch control processing configuration for a variable speed wind turbine.

FIG. 1 illustrates a circuit diagram of one implementation for the variable speed wind turbine 100 having a passive grid side rectifier configuration consistent with the invention. Wind turbine 100 includes an electrical generator 110 having a stator 113 and a rotor 12 connected to a generator rotor shaft 111. Although not shown, generator rotor shaft 111 is connected to wind blades for wind turbine 100. An implementation of this connection may be through a gear box (as shown in FIG. 3 at 302). In one embodiment, generator 110 is implemented as a doubly-fed wound rotor induction generator such that rotor 112 and stator 113 both include two-pole, 3 phase windings to generate electric power from rotation of rotor shaft 111. Generator 110 supplies fixed frequency AC signals (electrical power) to the power grid ("grid") from stator 113. Rotor 112 may receive slip and excitation power for the operation of generator 10 from the power conversion system ("power converter") 150 through a passive grid side rectifier 154. Rotor 112 may also direct excess generated power to converter 150, which can dissipate the excess generated power.

Generator 110 is coupled to the power converter 150 via inductors 140. Inductors 140 act as a filter to prevent large voltage changes on the windings within generator 110. Power converter 150 is coupled to power transformer 180. Power transformer 180 may be, for example, a 690V/480V power transformer with an integrated choke or separated choke "inductor." In particular, power transformer 180 supplies 690V to the grid and 480V to power converter 150. Power transformer 180 is coupled to a grid charge circuit including switches 145 and resistors 146 to charge power converter 150, without significant inrush current, by power transformer 180. This circuit is also coupled to an electromagnetic compatibility (EMC) filter 140, which filters harmonic distortion caused by power converter 150. An over-voltage protection (OVP) circuit 160 is also coupled to generator 110. OVP circuit 160 operates to protect power converter 150 from damage in over-voltage conditions.

Generator 110 supplies power to the grid via stator 113. Stator 113 connects to the grid via a delta ("Δ") connector 131A and main connecter 105 or via a Y connector 131B and main connector 105. The Δ connector 131A and main connector 105 can configure windings in stator 113 so that they are in a Δ connection. The Y connector 131B and main connector 105 can configure windings in stator 113 so they are in a Y connection. In one implementation, the same stator windings are used for the Δ and Y connections. In this manner, a Y-connection reduces iron losses in stator 113 and permits a wider speed range for low wind speeds. Thus, generator 110 can selectively provide electrical power to the grid from stator 113 via Δ connector 131A and main connecter 105 or Y connector 131B and main connecter 105. Furthermore, this allows wind turbine 100 to reduce power loss by selectively connecting generator 110 to the grid using the delta, connector 131A and main connecter 105 or the Y connector 131B and main connecter 105. The grid operates as a 3-phase 690V utility power grid at a fixed frequency such as 60 Hz. The grid may also operate at other voltages or fixed frequencies, such as 50 Hz, or with a different number of phases.

Power Converter

Variable speed wind turbine 100 includes a converter processor 170 coupled to power converter 150 to control components within turbine 100, including regulating the turbine's output power flow and controlling components, such as power converter 150. In one embodiment, converter processor 170 controls active components in power converter 150 so as to control total electrical quantities supplied to the grid. Such electrical quantities may include the total current and power supplied to the grid. The operation of controlling power converter 150 by converter processor 170 will be described in more detail below.

Power converter 150 includes an active generator side inverter ("active inverter 151"), DC link 152, power dissipating element 153, and passive grid side rectifier 154 ("passive rectifier 154"). For purposes of illustration, power converter 150 is shown with single elements; however, any number of elements may be implemented in power converter 150. For example, power converter 150 may include any number of passive rectifiers in parallel with passive rectifier 154. Such a configuration would be particularly useful in situations where a wind turbine provides a low power mode and at least one higher power mode, where one or more of the parallel rectifiers would be enabled in the higher power generator mode(s). Multiple power dissipating elements 153 may also be provided.

Normal operation for wind turbine 100 is at below synchronous speed such that power flow is directed from power converter 150 to generator 110. Consequently, in most instances, the components of active inverter 151 operate as an inverter to convert DC voltage on DC link 152 into variable frequency AC signals for generator 110. Thus, in the following implementations, active inverter 151 is referred to as an "inverter." In certain instances, however, wind turbine 100 may operate at above synchronous speed such that power flow is reversed (i.e., excess power is being generated from generator 110) and the components of active inverter 151 may be used as a rectifier. That is, when power flow is reversed, active inverter 151 operates to convert excess power being generated from generator 110 into a DC voltage for power converter 150. This excess power can be dissipated or discharged by dissipating element 153, which will be explained in further detail below.

Active inverter 151 includes active components or switches in a three-phase bridge configuration. In one embodiment, the active switches are IGBTs. These active switches may be other types of switches, such as, for example, bipolar junction transistors or field effect transistors.

In one embodiment, pulse width modulated (PWM) current regulation techniques are used to selectively control the active switches in active inverter 151 under a scalar control algorithm ("scalar control algorithm"), as described below. The scalar control algorithm allows for individual and/or independent PWM control for each phase of rotor 112 based on measured electrical quantities for each phase of the grid. The scalar control algorithm can control, individually and/or independently, electrical quantities for each phase of the grid. While other methods of control could also be employed, such as torque control using field oriented control, such as that described in the '187 patent, FOC-type control is implemented in a different way, performs different functions, and achieves poorer results than the power control method described herein.

The operation of active inverter 151 at below and above synchronous speed will now be explained. At below synchronous speed, active inverter 151 acts as an inverter, converting DC voltage on DC link 152 into variable frequency AC signals that are supplied to generator 110. At above synchronous speed, active inverter 151 acts as a rectifier, converting variable frequency AC signals from generator 110 to a DC voltage, which is placed on DC link 152. As will be described in further detail below, when the DC voltage on DC link 152 exceeds a threshold, power dissipating element 153 will lower the voltage on DC link 152 by burning off excess power that is generated from generator 110.

DC link 152 includes a series of capacitor elements. One or more sets of resistors can be added in some implementations to discharge the capacitor elements and improve symmetry. In particular, the voltage drop across each portion of the link should be substantially the same (or substantially symmetrical). DC link 152, however, may be implemented with other types of voltage storage circuit configurations.

The operation of DC link 152 at below and above synchronous speed will now be explained. At below synchronous speed, DC link 152 stores a constant DC voltage, which can be mathematically calculated from the voltage from power transformer 180 that is placed on the passive rectifier 154. In the case of the voltage from power transformer 180 being 480V, the DC link voltage is 480V×√2. At above synchronous speed, the voltage on DC link 152 may increase because power generated from rotor 112 charges DC link 152.

Power dissipating element 153 includes a pair of active switches (switches of this type are typically sold as pairs) having a common connection to a burn-off resistor and inductor connected in series. The burn off resistor can be used to discharge excess voltage on DC link 152, thereby dissipating excess power being generated from generator 110. The inductor can be used in some implementations to reduce current ripple in power dissipating element 153 to protect it from damage. The upper switch is either controlled or permanently biased into a high impedance or "off" condition. Thus, in an alternate embodiment, only the lower switch may be provided. Additionally, the order of the circuit components, e.g., the controlled switch, the resistor, and the inductor in the embodiment of FIG. 1, can be altered. In sum, power dissipating element can employ any structure to dissipate excess power on DC link 152.

The operation of power dissipating element 153 at below and above synchronous speed will now be explained. At below synchronous speed, the lower switch is turned off such that power dissipating element 153 acts as an open circuit, which allows DC voltage from passive rectifier 154 to be stored in DC link 152. At above synchronous speed, the lower switch can be selectively turned on to allow excess voltage on DC link 152 to be discharged in the burn off resistor. In this process, excess power from rotor 112 is being dissipated at above synchronous speed.

Passive rectifier 154 can include six power rectifier diodes connected in a three phase bridge configuration. The operation of passive rectifier 154 at below and above synchronous speed will now be explained. At below synchronous speed (a condition where the relative grid voltage is higher than the DC link voltage), passive rectifier 154 operates to convert fixed frequency AC signals from the power grid into a DC voltage. The DC voltage from passive rectifier 154 is placed on DC link 152 to maintain the DC link voltage at a predetermined voltage.

In one embodiment, if the lower active switch in power dissipating element 153 is turned off, power dissipating element 153 acts as an open circuit and the DC voltage from passive rectifier 154 passes directly to DC link 152. At above synchronous speed when power is being generated from generator 110, the DC link voltage will exceed the grid voltage. The diodes of passive rectifier 154 act to prevent conversion of the DC link voltage into a current. Accordingly, passive rectifier 154 does not operate to supply power to the grid. Moreover, the diodes comprising passive rectifier 154 and the power dissipating element 153 are designed to prevent breakdown of the diodes at times when the high DC link voltage is discharged by power dissipating element 153.

Converter Processor

Converter processor 170 can be used as the power controller and internal control and supervision of power converter 150 for wind turbine 100. In one embodiment, converter processor 170 controls the active components or switches in active inverter 151 using scalar power control with a scalar control algorithm as described in FIGS. 4 and 5. Converter processor 170 can also control power dissipating element 153 using the method described in FIG. 2.

To control these active switches using the scalar power control with the scalar control algorithm, converter processor 170 uses input signals such as generator speed $f_{gen}$, grid voltage $U_{grid}$, grid current $I_{grid}$, and measured rotor current values $I_{rotor}$, for, for each phase of rotor 112 (IR1, IR2, IR3). Converter processor 170 also uses a grid frequency signal indicating the operating frequency of the grid, which can be calculated from the $U_{grid}$ signal. These input signals and the grid frequency signal allow converter processor 170 to control power to the grid without performing a coordinate transformation of AC signals. This allows for precise control of electrical quantities for each phase of the grid because information regarding each phase of the grid is maintained (as opposed to being lost in a transformation process).

Generator speed can be measured or derived, in a sensorless system, from measured electrical quantities. Generator speed is used to control, among other things, the frequency of the PWM control of inverter 151.

$I_{grid}$ and $U_{grid}$ indicate current and voltage measurements, respectively, on the grid. These measurements can represent current and voltage measurements for each phase of the grid. $I_{grid}$ and $U_{grid}$ are also used by converter processor 170 to calculate active and reactive power and reference waveforms to control individually and independently electrical quantities on the grid. More specifically, these signals can be used to control current and active and reactive power for each phase of the grid as will be explained in further detail below.

Figure 2:
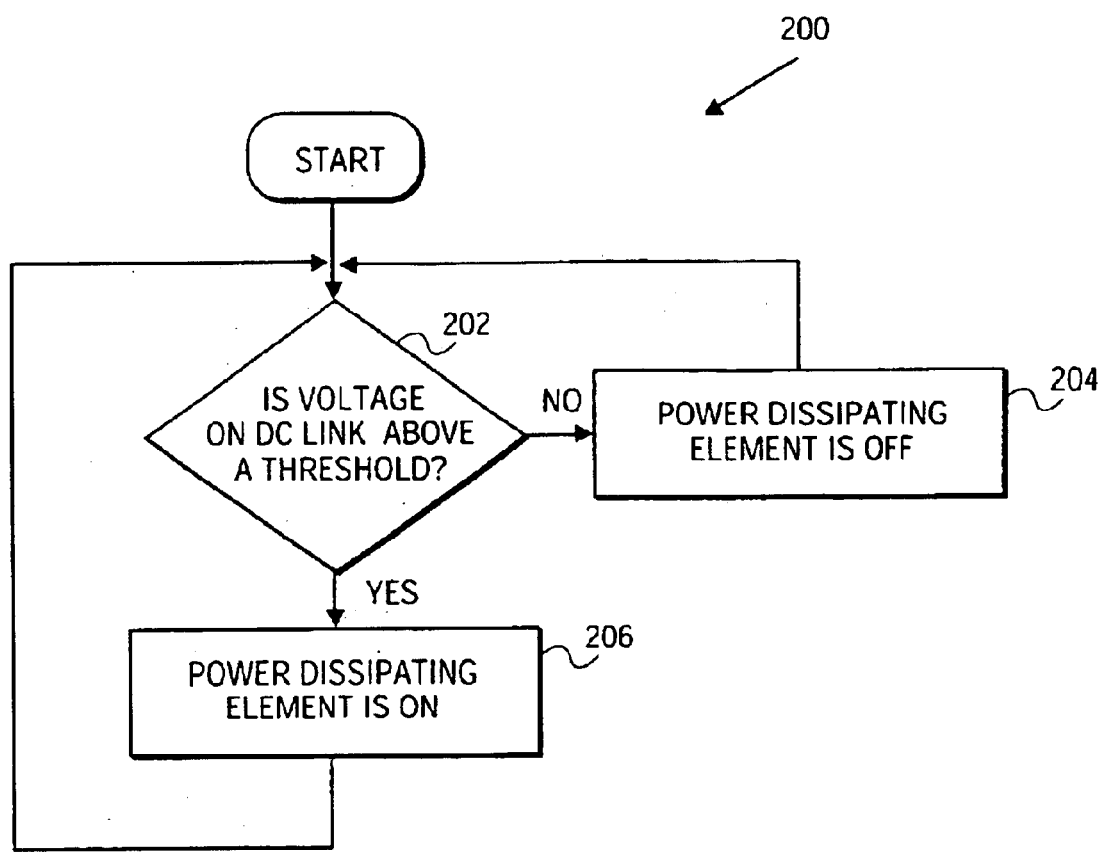
FIG. 2 illustrates a flow diagram of a method to control the power dissipating element of FIG. 1 at below and above synchronous speed.

To control power dissipating element 153 using the method of FIG. 2, converter processor 170 uses a signal line connected to power dissipating element 153. Also, converter processor 170 receives a sensed voltage level on DC link 152 using the "DC link" signal line as shown in FIG. 1. At a normal state (below synchronous speed), the voltage level on DC link 152 is at an acceptable threshold. At an abnormal state (above synchronous speed) caused by, e.g., a sudden wind gust, the voltage level on DC link 152 may be above the acceptable threshold. This is caused by generator 110 creating excess power because of the wind gust. In this situation, converter processor 170 can send a control signal over the connecting signal line to the lower active switch in power dissipating element 153 such that the excess generated power is burned off or discharged in power dissipating element 153. In an alternative embodiment, converter processor can control power dissipating element 153 with time-varying signals, such as by using pulse width modulation (PWM) signals so as to avoid overstressing power dissipating element 153. One example of this PWM control would be controlling the power dissipating element 153 like a brake chopper. For instance, the active switches in power dissipating element 153 can be selectively "turned on" or "turned off" with a selected duty cycle. The duty cycle can be adjusted based on the DC link voltage.

The above description provides exemplary implementations of converter processor 170. Converter processor 170 may, alternatively or additionally, include, e.g., separate drive circuits and controllers to drive and control the active switches in converter 151 and power dissipating element 153. Converter processor 170 may also receive other types of input signals such as $U_{sync}$. $U_{sync}$ can represent a voltage measurement created by the magnetic buildup on stator 113 of generator 110. $U_{sync}$ can be used at start up of wind turbine 100 in that it provides an indication of when generator 110 is to be connected to the grid. For example, if $U_{sync}$ is synchronized with the $U_{grid}$ signal, generator 10 can be connected to the grid in this instance.

Power Dissipating Element Control

FIG. 2 illustrates a flow diagram of a method to control power dissipating element 153 by converter processor 170 in FIG. 1 at below and above synchronous speed. Initially, the process begins at stage 202. At this stage, converter processor 170 senses a voltage on DC link 152 and determines if the voltage is above a threshold. For example, converter processor 170 may receive sensed DC voltage levels for DC link 152 using a "DC link" input signal as shown in FIG. 1. In one embodiment, the threshold is set above the normal voltage level or value on DC link 152 at below synchronous speed, which may equal √2 times the voltage for power converter 150. For example, the threshold may be set above 480V×√2. The threshold voltage may also be set at other voltage levels such as above 690V×√2 if power converter 150 operates at 690V. The threshold voltage is preferably below a level based on the DC link 152 voltage ratings to avoid damaging DC link 152. If the voltage is not above the threshold, converter processor 170 at stage 204 maintains the active switches in power dissipating element 153 in an off position. Because the voltage on DC link 152 is not greater than the threshold, it can be determined that generator 110 is operating at below synchronous speed. Thus, no measurement of generator speed is necessary to make a determination of whether generator 110 is operating at below synchronous speed.

On the other hand, if converter processor 170 determines the voltage on DC link 152 is above the threshold, converter processor 170 at stage 206 controls power dissipating element to turn on such that the excess voltage from DC link 152 (or power from the rotor of generator 110 at above synchronous speed) is discharged. In one embodiment, after this stage, converter processor 170 can turn off the power dissipating element 153 if it senses that the voltage on DC link 152 is at a normal operating level such as, for example, 480V×√2. In an alternative embodiment, converter processor 170 may turn off the switches at a different voltage level that is acceptable for operating turbine 100. For example, the power dissipating element 153 can be disabled at a voltage lower than the voltage used to enable power dissipating element 153, providing hysteresis. This threshold can also be adjustable or configurable based on the operating environment of turbine 100. After the power dissipating element is turned off, the process may continue at stage 202 again to determine if the voltage on DC link 152 is above a threshold, or alternatively, the process may end.

Scalar Power Control and Dependent Pitch Control Processing Configuration

FIG. 3 illustrates one example of a block diagram of a scalar power control and dependent pitch control processing configuration for variable speed wind turbine 100 consistent with the invention. Referring to FIG. 3, the basic components for wind turbine 100 include a generator 110 having a rotor 112 and a stator 113. Stator 113 connects and provides electrical power created by generator 110 to the grid. Rotor 112 converts mechanical energy, which is provided by wind blades 301, into electrical energy for generator 110. Although two wind blades are shown, three wind blades, or any number of wind blades, may be used for wind turbine 100. Wind blades 301 connect to generator 110 via a main shaft 303, gear box 302, and generator rotor shaft 111. Gear box 302 connects main shaft 303 to generator rotor shaft 111 and increases the rotational speed for generator rotor shaft 111.

The control processing configuration ("control system") for wind turbine 100 can be implemented in hardware as a multi-processor system. For example, although not shown, the control system may include a ground processor hardware unit, which is located at the bottom of the tower of a turbine, a top processor hardware unit, which is located in the nacelle of the turbine (not shown), a hub processor turbine unit, which is located in the hub of the turbine and rotates with turbine's blades, and a converter processor hardware unit, which is located in the nacelle. Each of these hardware units may include one or more processor chips and may be connected to each other by a suitably fast and efficient network to enable data transfer between the units, such as an Attached Resource Computer Network (ARCnet). Other interfacing protocols could alternatively be used, such as Controller Area Network (CAN), Ethernet, FDDI, Token Ring and local area network (LAN) protocols.

Functionally, the control system may include a number of controllers for controlling components within wind turbine 100 as shown in FIG. 3. Parameters such as communication speed, sample time requirements, and processing capacity determine where portions of the functional blocks are physically computed (that is, which operations are performed in which hardware unit). For example, in one implementation, the functions of the power controller are physically computed within the converter processor. Operations for a single functional block may also be performed in a number of hardware units.

The control system includes a main controller 310 coupled to a power controller 312 and pitch controller 316. Main controller 310 can be used to control the overall functions for wind turbine 100. Pitch controller 316 is dependent on power controller 312 through a power error feed forward 314. Pitch controller 316 controls the pitch angle for wind blades 301. In one embodiment, power controller 312 can control grid currents for each respective phase of the grid and, thereby, control active and, reactive power on the grid. Power controller 312 also controls power converter 150 to provide power to generator 110 and to discharge or burn off excess power from generator 110.

Main controller 310 generates and provides a main pitch reference signal to pitch controller 316 and a power reference signal ($PMG_{ref}$) to power controller 312. The manner in which main pitch reference signal and $PMG_{ref}$ signal are generated will be discussed in further detail below. To generate the main pitch reference and $PMG_{ref}$ signals, main controller 310 processes received measurements as described in more detail in FIGS. 6 through 8. Main controller 310 may also receive commands from a user or other internal or external processing units. Main controller 310 may also receive other types of input signals such as, for example, temperature measurement signals indicating temperature readings of components or status signals on whether switches or connections or "on" or "off" in wind turbine 100. Such input signals may be used to control the overall operation and supervision of wind turbine 100.

Power controller 312 receives $PMG_{ref}$ signal from main controller 310 to determine a power error signal. The power error signal may include information related to a calculated error for active and reactive power based on current and voltage levels for each phase of the grid. For example, power controller 312 may calculate the power error signal as the magnitude of the target real power minus the magnitude of the measured real power. Power controller 312 also receives a generator speed signal from generator 110, which may be used to control components in power converter 150. Power controller 312 may also receive the same inputs signals for converter processor 170 as shown in FIG. 1. Thus, power controller 312 may receive the $U_{grid}$, $I_{grid}$, generator speed, and current measurement t signals. Power controller 312 uses these signals to control grid currents for each phase of the grid and, thereby, active and reactive power.

Power error feed forward 314 receives the power error signal from power controller 312 and processes this signal to determine the secondary pitch reference signal. Power error feed forward 314 allows for dependency between pitch controller 315 and power controller 312. The functions of power error forward feed 314 can be performed in any of the hardware units within wind turbine 100, e.g., the top processor hardware unit. Power error feed forward 314 allows for quick reaction time for pitch controller 316 to respond to errors detected by power controller 312. That is, power error feed forward 314 ensures a quick and reliable reaction by pitch controller 316 to control the pitch for wind blades 301 so as to maintain stability for wind turbine 100.

For example, power error feed forward 314 may receive the power error signal (i.e., the magnitude of the target real power minus the magnitude of the measured real power) from power controller 312. Based on a nonlinear table, power error feed forward 314 generates the secondary pitch reference signal for pitch controller 316. In other words, if the power error signal is considerably high, e.g., in one embodiment higher than 20% of nominal power, this would indicate that the power from generator 110 is lower than expected, which means a risk of strong acceleration that may lead to an overspeed condition for generator 110. Power error feed forward 314 would thus set the secondary pitch reference signal to a nonzero value based on the power error from power controller 312 and the actual pitch angle from wind blades 301 to compensate for the error. If the power error is within tolerances, the secondary pitch reference is set to zero.

Although described in a multi-processor system, a single processor can be used to implement the functions performed by pitch controller 316, power controller 312, power error feed forward 314, and main controller 310. In particular, the functions for these controllers can be embodied in software, which can be executed by a processor to perform their respective functions.

Scalar Power Control

Wind turbine 100 uses scalar power control to control total power and total current levels for each phase of the grid. This avoids using complicated and expensive FOC processing. One purpose of scalar power control is to provide a constant power output from the generator for a given wind speed. Furthermore, scalar power control, as described below, provides more precise control of electrical quantities for each of the three phases of the grid so as to provide optimum operation for the grid. To implement scalar power control, wind turbine 100 uses a power controller 312 operating a scalar control algorithm described in FIG. 5. The following scalar power control techniques can be implemented with a time-based system. Specifically, measurements taken in real time or instantaneously can be used to provide scalar power control.

Power Controller

Figure 4:
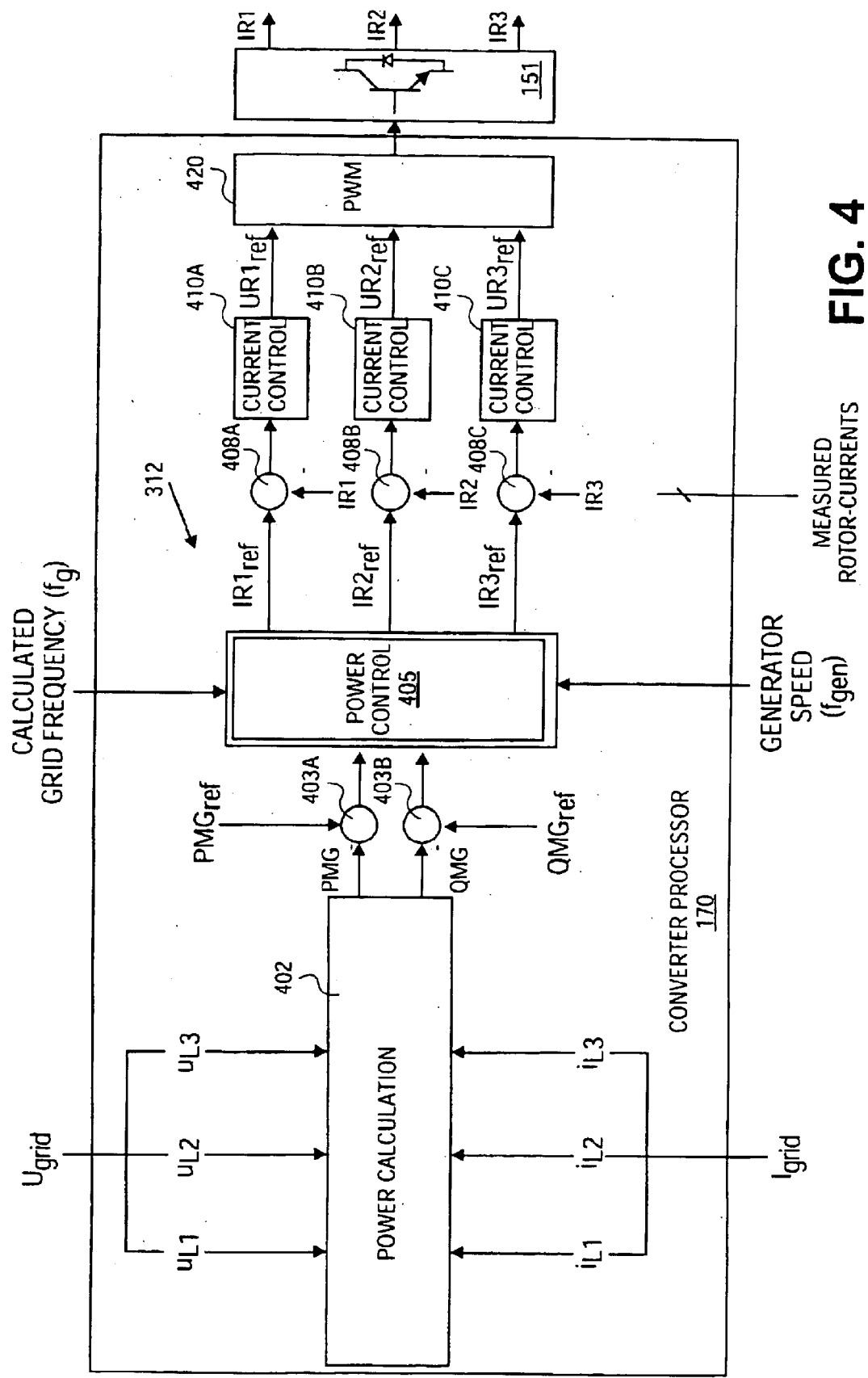
FIG. 4 illustrates a processing flow diagram of one implementation of scalar power control, which can be used by the power controller of FIG. 3.

FIG. 4 illustrates one example of a processing flow diagram for the power controller 312 of converter processor 170. At processing stage 402, $U_{grid}$ and $I_{grid}$ signals are received. $U_{grid}$ provides voltage measurement information for each of the three phases of the grid represented as $u_{L1}$–$u_{L3}$. $I_{grid}$ provides current measurement information for each of the three phases of the grid represented as $i_{L1}$–$i_{L3}$. Each voltage and current measurement for each phase is used to calculate active and reactive power, as detailed in FIG. 5. The calculated active power, which is represented as PMG, and the reactive power, which is represented as QMG, are directed to processing stages 403A and 403B, respectively.

At processing stages 403A and 403B, a $PMG_{ref}$ signal and a QMG signal are received. These signals represent ideal active power values for a particular wind speed and derived reactive power. At these stages, PMG and QMG values are compared with $PMG_{ref}$ and $QMG_{ref}$ values. The information related to the comparison is sent to power control processing stage 405. At processing stage 405, a calculated grid frequency and generator speed information are received. This information along with information from processing stages 403A and 403B are used to calculate current reference values $IR1_{ref}$–$IR3_{ref}$. These values are directed to processing stages 408A–408C, respectively. At processing stages 408A–408C, measured rotor currents IR1–IR3 are received from rotor 112. Processing stages 408A–408C compares the measured current values IR1–IR3 with their respective current reference values $IR1_{ref}$–$IR3_{ref}$. The comparison information is sent to current control processing stages 410A–410C.

The current control processing stages 410A–410C determine PWM control signals $UR1_{ref}$–$UR3_{ref}$, which are sent to a PWM processing module 420. PWM processing module uses these signals to control the active switches in active inverter 151, which then outputs new rotor currents IR1–IR3. Because the $U_{grid}$ and $I_{grid}$ values for each phase on the grid are determined by the rotor currents IR1–IR3, the power controller 312 can control total active and reactive power and the current level for each phase on the grid by controlling the rotor currents IR1–IR3. The control of rotor currents IR1–IR3 will be described in more detail regarding the scalar control algorithm detailed in FIG. 5.

Scalar Control Algorithm

Figure 5:
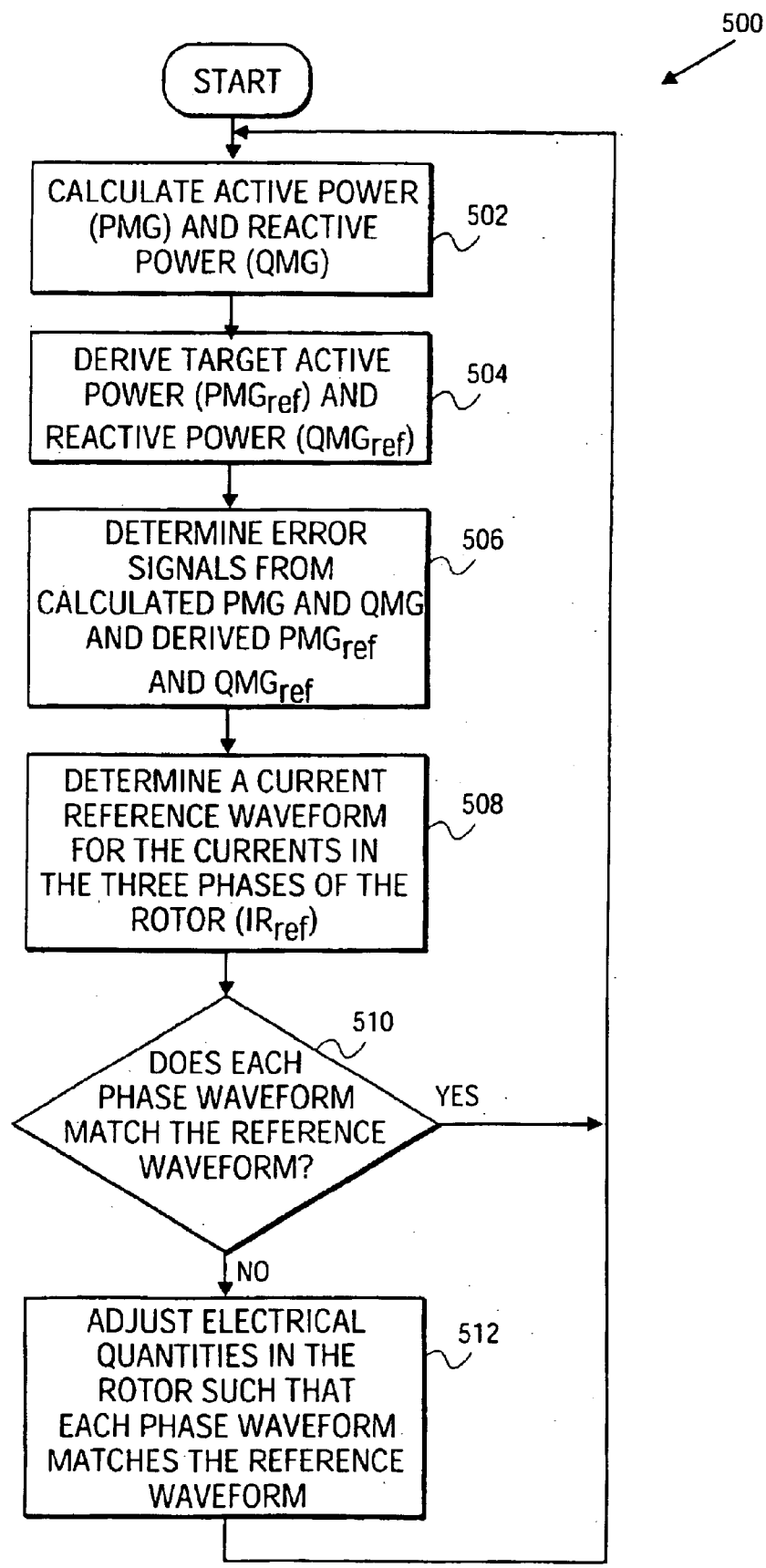
FIG. 5 illustrates a flow diagram of a method for performing scalar power control using controllable oscillating signals.

FIG. 5 illustrates a flow diagram of a method 500 for performing a scalar control algorithm by the power control 312 of FIG. 4. In one implementation, the scalar control algorithm is based on controlling oscillating signals. That is, the scalar control algorithm controls oscillating rotor currents IR1–IR3 based on, e.g., a sinusoidal waveform.

Initially, method 500 begins at stage 502, where active power PMG and reactive power QMG are calculated. This stage corresponds with processing stage 402 of FIG. 4. The total active power PMG can be calculated instantaneously by using the following equation:

$$p(t) = u_1(t) \cdot i_1(t) + u_2(t) \cdot i_2(t) + u_3(t) \cdot i_3(t)$$

where $u_{L1}$–$u_{L3}$ correspond to $u_1(t)$–$u_3(t)$ and $i_{L1}$–$i_{L3}$ correspond to $i_1(t)$–$i_3(t)$.

The total reactive power QMG can also be calculated instantaneously by using the following equation:

$$q(t) = \frac{1}{\sqrt{3}}[i_1(t) \cdot (u_3(t) - u_2(t)) + i_2(t) \cdot (u_1(t) - u_2(t)) + i_3(t) \cdot (u_2(t) - u_1(t))]$$

where the instantaneous values for the current i(t) and u(t) can be described as:

$$i(t) = \hat{i} \cdot \sin(\omega_g t + \phi_i) \text{ and } u(t) = \hat{u} \cdot \sin(\omega_g t + \phi_u)$$

and $\hat{i}$ is the amplitude of the current, $\hat{u}$ the amplitude of the voltage and $\omega_g$ is calculated from the grid frequency $f_g$. The power calculations can be performed for each phase of the grid to obtain rotor current references IR1–IR3 for each phase of the rotor.

At stage 504, a target active power ($PMG_{ref}$) and a target reactive power ($QMG_{ref}$) are derived. The $PMG_{ref}$ value can be calculated in main controller 310. For example, main controller 310 can use a lookup table to determine ideal active power for a given measured generator speed and rotor current. The $QMG_{ref}$ value can be user selected. For example, the $QMG_{ref}$ value can be selected based on either a selectable number of variables or a selected power factor angle depending on the functions and results of reactive power compensation desired. That is, depending on the different ways that the reactive power is determined, a final target value $QMG_{ref}$ is derived.

At stage 506, error signals are determined for active power and reactive power based on calculations using PMG and QMG and $PMG_{ref}$ and $QMG_{ref}$. For example, the $PMG_{ref}$ is compared with PMG to generate an active power error signal and $QMG_{ref}$ is compared with QMG to generate a reactive power error signal. These error signals could be determined for each phase of the grid. This stage corresponds with processing stages 403A and 403B of FIG. 4.

Turbine 100 can operate as a doubly-fed turbine with rotor excitation control (as opposed to providing reactive power and power factor control on the grid or line side). That is, the turbine can provide reactive power and power factor control on the generator or rotor (or "machine" side) with a control mechanism to regulate the active and reactive power generated on the grid by controlling rotor excitation. At stage 508, a current reference waveform ($IR_{ref}$) is determined for the currents in the three phases of the rotor. This stage calculates current reference waveforms ($IR1_{ref}$–$IR3_{ref}$). The rotor currents can be described as the sum of current components (active and reactive), where the first part is the active component $i_{r\,real}$ responsible for the active power and the second component $i_{r\,complex}$ is the magnetic component responsible for the reactive power such that each instantaneous rotor current is:

$$i_r(t) = i_{rreal}(t) + i_{rcomplex}(t) \text{ and } i_r(t) = \hat{i}_r \cdot \sin(\omega_r t + \beta)$$

where the angular frequency $\omega_r$ for the rotor is calculated out of the rotor speed $\omega_m$ and the grid frequency with:

$$\omega_r = \phi_g - Ps \cdot \omega_m Ps\text{:number of pole pairs}$$

The $IR1_{ref}$–$IR3_{ref}$ values can be calculated in the power control processing stage of FIG. 4 using measured grid frequency and generator speed. The calculations can be based on trigonometric functions, where the amplitude of the rotor-current $\hat{I}_r$ is the trigonometric sum of the active and reactive part of the desired rotor current and the load angle $\beta$ ($\forall \beta$), which is the phase angle between the two components. For example, $\hat{I}_r$ can be calculated using the following equation:

$$\hat{I}_r = \sqrt{i_{rreal}^2 + i_{rcomplex}^2}$$

and the load angle ($\forall \beta$) could be calculated using the following equation:

$$\forall \beta = \arctan(i_r\text{complex}/i_r\text{ real})$$

At stage 510, a determination is made if each measured current value or waveform matches the calculated current reference waveforms $IR1_{ref}$–$IR3_{ref}$. This stage corresponds to processing stages 408A–408C of FIG. 4. If the waveforms match, method 500 continues back to stage 510. If the waveforms do not match, an error is determined and method 500 continues to stage 512.

At stage 512, electrical quantities in the rotor are adjusted such that each measured current waveforms (IR1–IR3) matches the current reference waveform ($IR1_{ref}$–$IR3_{ref}$). This stage corresponds to processing stages 410A–410C, and 420 of FIG. 4. In particular, based on the determined error, desired voltage references ($UR1_{ref}$–$UR3_{ref}$) are set for PWM processing. PWM processing uses these voltage references ($UR1_{ref}$–$UR3_{ref}$) to control active switches in active inverter 151, which control rotor currents IR1–IR3. The above method can be continuously performed to adjust rotor currents for each phase of the rotor thereby controlling electrical quantities for each phase of the grid.

In a similar manner, the power for each phase of the grid could be determined independently. In this case, the rotor currents may be controlled such that each phase of the grid is controlled independently, making the turbine 100 responsive to asymmetry present on the grid.

Dependent Pitch Control

The main components for providing dependent pitch control are main controller 310, power controller 312, power error feed forward 314, and pitch controller 316. The main controller 310 calculates a power reference and a main pitch reference for the power controller 312 and pitch controller 316, respectively. The internal components of main controller 310 to calculate the power reference and main pitch reference will now be explained.

Figure 6:
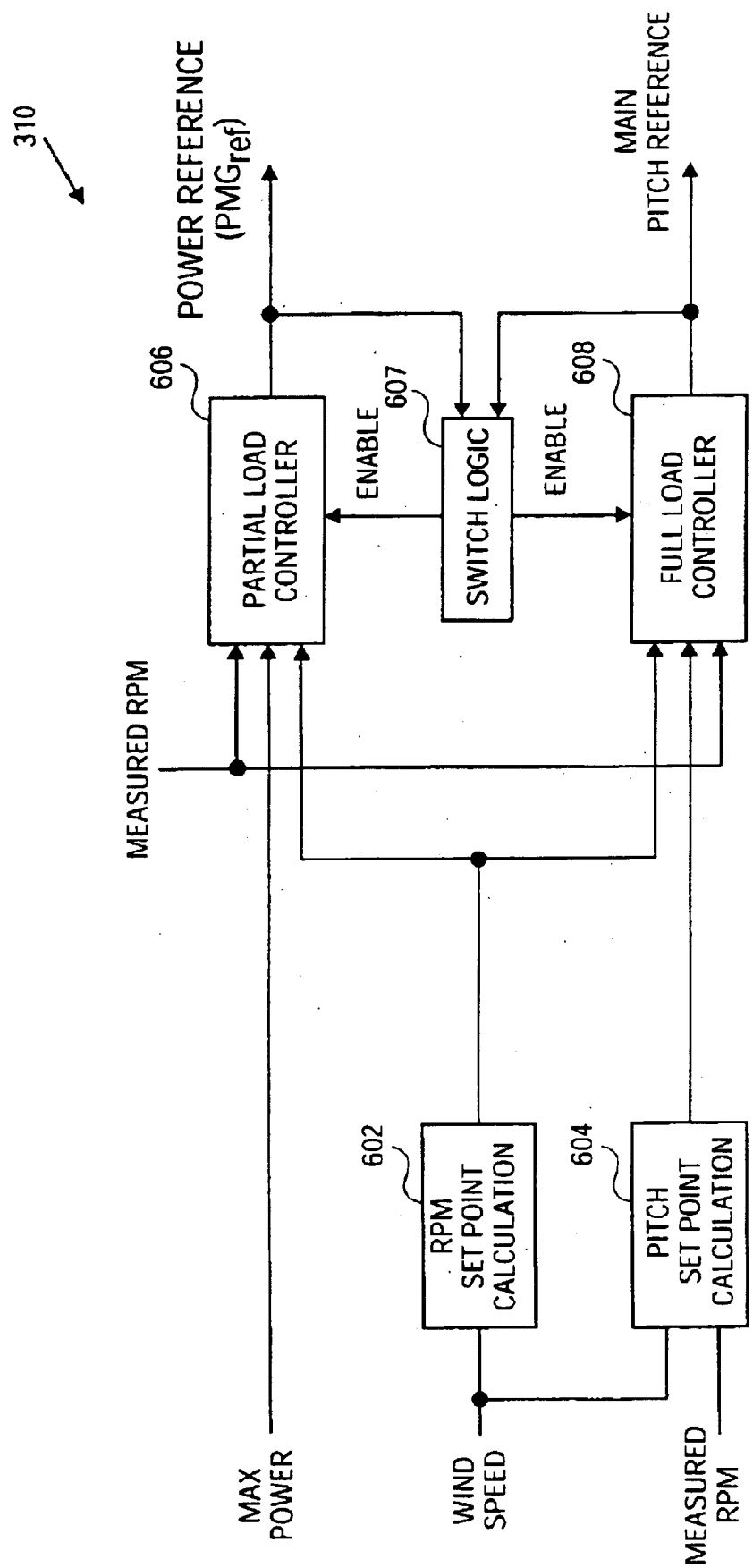
FIG. 6 illustrates an internal block diagram of one implementation for the main controller of FIG. 3.

FIG. 6 illustrates an internal block diagram of one implementation for the main controller 310 of FIG. 3. Main controller 310 includes a RPM set point calculation 602 and a pitch set point calculation 604 providing optimal RPM and pitch set point values. These values are chosen to allow wind turbine 100 to deliver as much electrical energy as possible. Main controller 310 also includes a partial load controller 606, switch logic 607, and full load controller 608.

Figure 7:
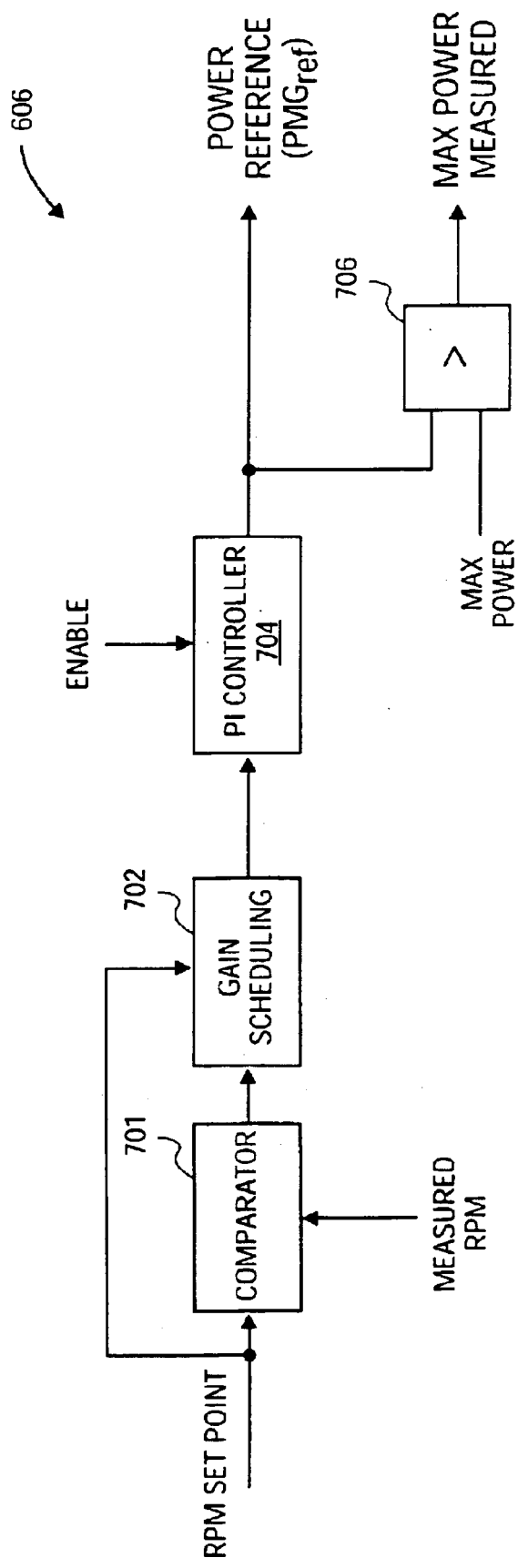
FIG. 7 illustrates aspects of one implementation for the partial load controller of FIG. 6.

The RPM set point calculation 602 receives a wind speed measurement to set the RPM set point value. Pitch set point calculation 604 receives a measured RPM value from the generator and the wind speed measurement to set the pitch set point value. Partial load controller 606 receives the measured RPM value, a maximum power value, and the RPM set point value to calculate the power reference ($PMG_{ref}$). Partial load controller 606 ensures the maximum power is not exceeded. FIG. 7 describes in further detail the manner in which partial load controller 606 calculates the power reference ($PMG_{ref}$). Full load controller 608 receives the measured RPM value, pitch set point calculation value, and the RPM set point calculation value to calculate the main pitch reference. Full load controller 608 ensures that the pitch angle is not lower than the optimal pitch angle.

Figure 8:
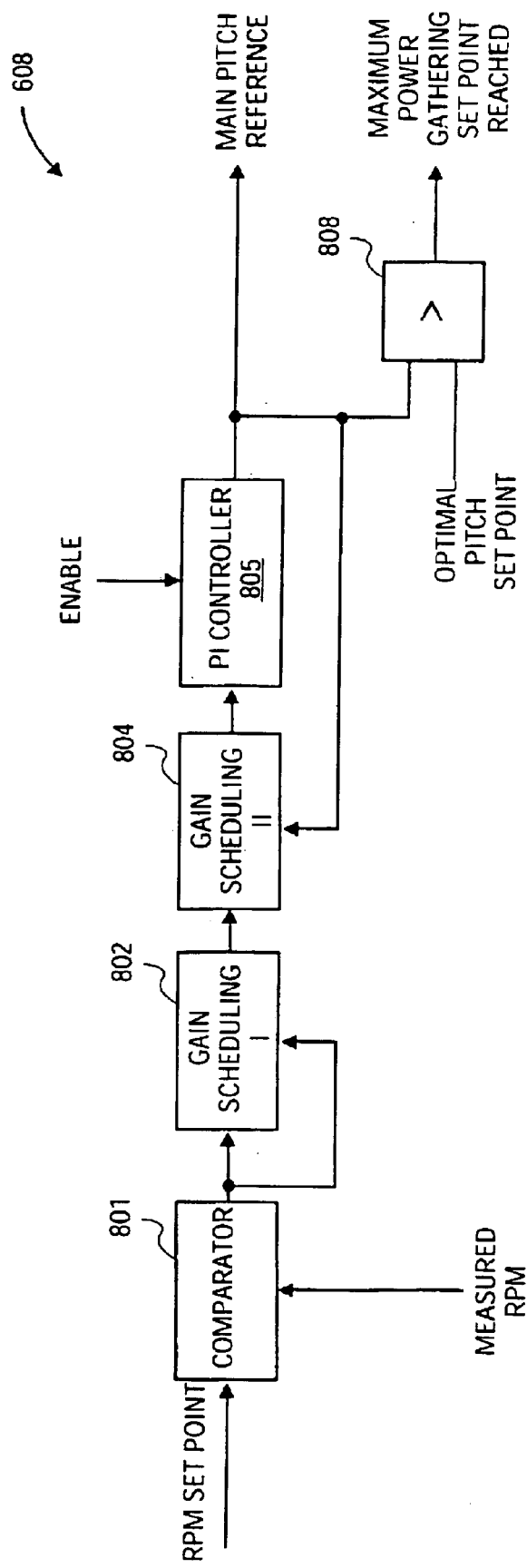
FIG. 8 illustrates aspects of one implementation for the full load controller of FIG. 6.

FIG. 8 describes in further detail the manner in which full load controller calculates the main pitch reference.

Referring to FIG. 6, switch logic 607 provides an enable signal to both partial load controller 606 and full load controller 608. The enable signal controls when portions of the partial load controller 606 and full load controller 608 are enabled to operate as will be described below in FIGS. 7 and 8.

FIG. 7 illustrates an internal block diagram of one implementation for the partial load controller 606 of FIG. 6. In one embodiment, partial load controller 606 is active only when the turbine power is operating at less than maximum power output. Referring to FIG. 7, a comparator 701 compares the measured RPM value with RPM set point calculation to determine an RPM error (e.g., RPM set point—measured RPM). This error is sent to PI controller 704 via gain scheduling 702, which also receives the RPM set point signal. Gain scheduling 702 allows the amplification (gain) for partial load controller 605 to be dependent on a certain signal, i.e., the RPM set point signal. PI controller 704 generates the power reference signal using the error signal from gain scheduling 702. In one embodiment, if the power reference signal exceeds the maximum power, a signal is sent to switch logic 607 to cause switch logic 607 to disable partial load controller 606 and enable full load controller 608, and the output will be clamped by controller 606 to the maximum power.

FIG. 8 illustrates an internal block diagram of one implementation for the full load controller 608 of FIG. 6. In one embodiment, full load controller 608 is active only when the wind turbine power is equal to the maximum power. If the wind speed is high enough, it may produce too much power and the turbine components may become overloaded. In this situation, the RPM generator speed is also controlled by moving the pitch angle away from the maximum power position for the wind blades.

Referring to FIG. 8, a comparator 801 compares the RPM set point with measured RPM to determine an RPM error (e.g., RPM set point—measured RPM). This error is sent to PI controller 805 via gain scheduling I 802 and gain scheduling II 804. Gain scheduling I802 receives the RPM error and gain scheduling II 804 receives main pitch reference signal. Gain scheduling 1802 and II 804 control gain for full load controller 608 dependent on RPM error and main pitch reference. PI controller 805 generates the main pitch reference signal using the RPM error. In one embodiment, if the main pitch reference is lower than the maximum power set point, a signal is sent to switch logic 607 to cause switch logic 607 to disable full load controller 608 and enable partial load controller 606, and the output will be clamped to the maximum power producing pitch set point. Main controller 310, however, can use other more complicated pitch and power reference generating schemes that ensure reduction of loads, noise, etc. For example, partial load controller 606 and full load controller 608 could use the power error feed forward signal to quickly react to a large power error.

Figure 9:
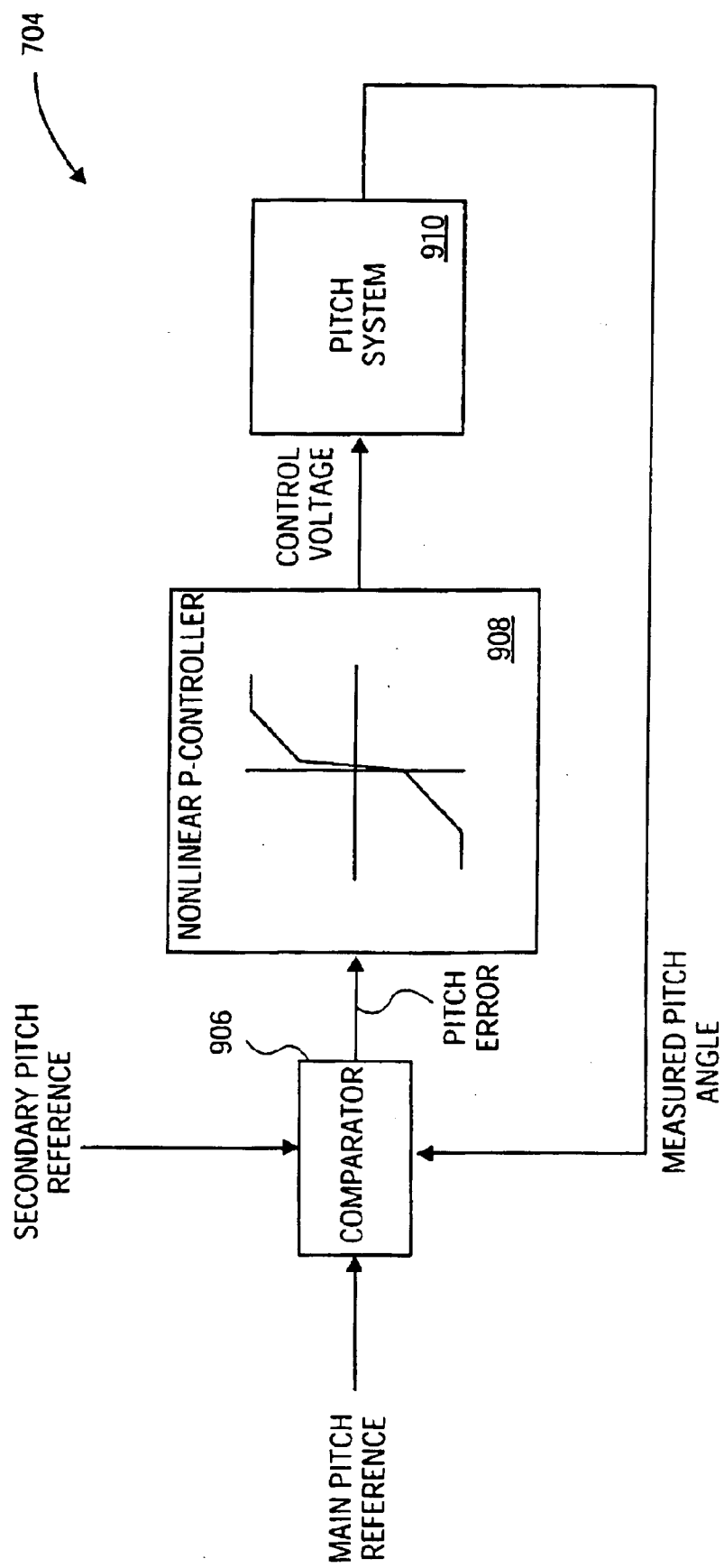
FIG. 9 illustrates a block diagram of one implementation for the pitch controller of FIG. 3.

FIG. 9 illustrates a block diagram of one implementation for the pitch controller 316 of FIG. 3. Referring to FIG. 9, pitch controller 316 includes a comparator 906 that compares a secondary pitch reference signal from power error feed forward 314, main pitch reference signal from main controller 310, and a measured pitch angle from pitch system 910 to determine a pitch error. The pitch error can be, e.g.,[(main pitch reference+secondary pitch reference)– measured pitch angle]. A non-linear P-controller 908 provides a control voltage to a pitch system 910 based on the pitch error. Pitch system 910 connects with one of the wind blades 301 and includes components to control the pitch of the wind blade. For example, pitch system 910 may include a hydraulic system where the control voltage is applied to a proportional value that generates a hydraulic flow moving a pitch cylinder that controls the pitch of a wind blade. The pitch position can be monitored by the displacement of the cylinder and feedback to comparator 906. The sample rate for pitch controller 316 can be set at a low value compared to the sample rate for power controller 312. For example, pitch controller 316 could operate at 50 Hz while power controller 312 could operate at 5 Khz.

Thus, a variable speed wind turbine is provided having a passive grid side rectifier with scalar power control and a pitch controller operating dependently with a power controller. Furthermore, while there has been illustrated and described what are at present considered to be exemplary implementations and methods of the present invention, various changes and modifications may be made, and equivalents may be substituted for elements thereof, without departing from the true scope of the invention. In particular, modifications may be made to adapt a particular element, technique, or implementation to the teachings of the present invention without departing from the spirit of the invention.

In addition, while the described implementations include hardware embodiments, which may run software to perform the methods described herein, the invention may also be implemented in hardware or software alone. Accordingly, the software can be embodied in a machine-readable medium such as, for example, a random access memory (RAM), read-only memory (ROM), compact disc (CD) memory, non-volatile flash memory, fixed disk, and other like memory devices. Furthermore, the processors and controller described herein can execute the software to perform the methods described above. Other embodiments of the invention will be apparent from consideration of the specification of the invention disclosed herein. Therefore, it is intended that the specification and examples be considered as exemplary only, with a true scope and spirit of the invention being indicated by the following claims.

What is claimed is:

1. A method of operating a variable speed wind turbine, comprising:
    configuring at least two phases of a stator or a generator for connection to a utility grid;
    providing a plurality of switches on the rotor-side of a generator; and
    controlling the switches such that electrical quantities for at least two phases of the utility grid are controlled independently.

2. A method for controlling power from an electrical generator to a power grid comprising:
    receiving voltage values and current values of the power grid relative to a time-based system;
    calculating active and reactive power from the voltage and current values without converting from the time-based system;
    determining a power error based on the active and reactive power;
    generating current reference values to control rotor currents in the electrical generator based on the determined power error without converting from the time-based system; and
    controlling the rotor currents in the electrical generator based on the current reference values.

3. The method of claim 2, wherein the receiving of the voltage values and current values includes receiving the voltage and current values for each phase of the power grid.

4. The method of claim 3, wherein the calculating of the active and reactive power includes calculating the active and reactive power for each phase of the power grid using the voltage and current values for each of the power grid.

5. The method of claim 2, wherein the generating of the current reference values includes generating the current reference values based on the determined power error, a power grid frequency, and a generator speed.

6. The method of claim 2, wherein the controlling of the rotor currents in the electrical generator includes controlling the rotor currents for each phase of the rotor in the electrical generator based on the current reference values.

7. The method of claim 2, further comprising:
controlling electrical quantities in each phase of the power grid by controlling the rotor currents in the electrical generator.

8. A system for controlling power from an electrical generator to a power grid comprising:
means for receiving voltage values and current values of the power grid relative to a time-based system;
means for calculating active and reactive power from the voltage and current values without converting from the time-based system;
means for determining a power error based on the active and reactive power;
means for generating current reference values to control rotor currents in the electrical generator based on the determined power error without converting from the time-based system; and
means for controlling the rotor currents in the electrical generator based on the current reference values.

9. The system of claim 8, wherein the means for generating current reference values includes means for generating current reference values without converting from a time-based system.

10. The system of claim 8, wherein the means for receiving of the voltage values and current values includes means for receiving the voltage and current values for each phase of the power grid.

11. The system of claim 10, wherein the means for calculating of the active and reactive power includes means for calculating the active and reactive power for each phase of the power grid using the voltage and current values for each of the power grid.

12. The system of claim 8, wherein the means for generating of the current reference values includes means for generating the current reference values based on the determined power error, a power grid frequency, and a generator speed.

13. The system of claim 8, wherein the means for controlling of the rotor currents in the electrical generator includes means for controlling the rotor currents for each phase of the rotor in the electrical generator based on the current reference values.

14. The system of claim 8, further comprising:
means for controlling electrical quantities in each phase of the power grid by controlling the rotor currents in the electrical generator.

15. A method for a variable speed wind turbine comprising:
generating rotor currents for an electrical generator connected to wind blades, the rotor currents corresponding to a plurality of phases of a power grid; and
controlling independently the rotor currents for each phase of the power grid.

16. The method of claim 15, wherein controlling independently the rotor currents includes controlling independently rotor currents for each phase of the power grid based on electrical characteristics of each phase of the power grid.

17. A variable speed wind turbine comprising:
a generator connected to wind blades that provides rotor currents, the rotor currents corresponding to a plurality of phases of a power grid; and
a controller to independently control the rotor currents for each phase of the power grid.

18. The variable speed wind turbine of claim 17, wherein the controller controls independently rotor currents for each phase of the power grid based on electrical characteristics of each phase of the power grid.

19. A method for a variable speed wind turbine comprising:
generating electrical power for a power grid using a rotor and stator of an electrical generator; and
controlling active switches in a power converter using a scalar control algorithm that controls each phase of the rotor based on measured electrical quantities of each phase of the power grid.

20. The method of claim 19, wherein controlling the active switches includes controlling the active switches using pulse width modulation (PWM) techniques.

21. The method of claim 19, further comprising:
receiving at least power grid frequency values and rotor current values for each phase of the rotor to control the active switches.

22. The method of claim 19, further comprising:
controlling the electrical power to the power grid without performing a coordinate transformation of AC signals.

23. A variable speed wind turbine comprising:
an electrical generator having a rotor and stator to generate electrical power for a power grid; and
a power converter to control the generated electrical power, the power converter including active switches controlled by a scalar control algorithm that controls each phase of the rotor based on measured electrical quantities of each phase of the power grid.

24. The variable speed wind turbine of claim 23, further comprising a controller to control the active switches of the power converter.

25. The variable speed wind turbine of claim 24, wherein the controller controls the active switches using pulse width modulation (PWM) techniques.

26. The variable speed wind turbine of claim 24, wherein the controller receives at least power grid frequency values and rotor current values for each phase of the rotor to control the active switches.

27. The variable speed wind turbine of claim 26, wherein the controller controls electrical power to the power grid without performing a coordinate transformation of AC signals.

28. A method for a power controller of a variable speed wind turbine comprising:
receiving power grid related information for a power grid;
calculating active and reactive power values for the power grid based on the received power grid related information;
comparing the calculated active and reactive power values with reference active and reactive power values, respectively;

generating current reference values based on the comparison of the calculated active and reactive power values with the reference active and reactive power values;

comparing the generated current reference values with measured current values; and generating new current values to control the active and reactive power for the power grid based on the comparison of the generated current reference values with the measured current values.

29. The method of claim 28, wherein the power grid related information includes voltage and current measurement values for each phase of the power grid.

30. The method of claim 28, further comprising:

generating control signals to control active switches that output the new current values.

31. The method of claim 30, wherein the active switches are controlled using pulse width modulation (PWM) techniques.

32. A computer-readable medium containing instructions, which if executed by a computing system, causes the computing system to perform a method comprising:

receiving voltage values and current values of a power grid relative to a time-based system;

calculating active and reactive power from the voltage and current values without converting from the time-based system;

determining a power error based on the active and reactive power;

generating current reference values to control rotor currents in an electrical generator based on the determined power error without converting from the time-based system; and controlling the rotor currents in the electrical generator based on the current reference values.

33. A computer-readable medium containing instructions, which if executed by a computing system, causes the computing system to perform a method comprising:

receiving power grid related information for the power grid;

calculating active and reactive power values for the power grid based on the received power grid related information;

comparing the calculated active and reactive power values with reference active and reactive power values, respectively;

generating current reference values based on the comparison of the calculated active and reactive power values with the reference active and reactive power values;

comparing the generated current reference values with measured current values; and generating new current values to control the active and reactive power for the power grid based on the comparison of the generated current reference values with the measured current values.

* * * * *

UNITED STATES PATENT AND TRADEMARK OFFICE
CERTIFICATE OF CORRECTION

PATENT NO. : 6,853,094 B2
DATED : February 8, 2005
INVENTOR(S) : Lorenz Feddersen et al.

It is certified that error appears in the above-identified patent and that said Letters Patent is hereby corrected as shown below:

Title page,
Item [57], ABSTRACT,
Line 10, please change "scaler" to -- scalar --.

Signed and Sealed this

Twenty-fourth Day of May, 2005

JON W. DUDAS
*Director of the United States Patent and Trademark Office*